United States Patent [19]

McCusker et al.

[11] 3,740,582

[45] June 19, 1973

[54] POWER CONTROL SYSTEM EMPLOYING PIEZO-FERROELECTRIC DEVICES

[75] Inventors: Joseph Henry McCusker; Stuart Stanley Perlman, both of Princeton, N.J.

[73] Assignee: RCA Corporation, New York, N.Y.

[22] Filed: June 28, 1971

[21] Appl. No.: 157,214

[52] U.S. Cl. ........ 307/252 N, 307/252 B, 307/293, 310/8.1, 323/22 SC, 323/24, 323/34

[51] Int. Cl. .... H03k 17/66, H03k 17/72, H01v 7/00

[58] Field of Search .................. 307/252 N, 252 W, 307/308, 247, 305, 252 B, 247 R, 247 A, 284, 293, 309; 328/1; 340/173.2; 310/8.1; 315/194, 196, 199; 323/22 SC, 24, 34

[56] References Cited

UNITED STATES PATENTS

| | | | |
|---|---|---|---|
| 3,656,005 | 4/1972 | Lee | 307/252 B X |
| 3,551,744 | 12/1970 | Keller | 307/247 |
| 2,782,397 | 2/1957 | Young | 340/173.2 |
| 3,584,242 | 6/1971 | Fujita | 307/308 |
| 3,568,005 | 3/1971 | Atkins | 307/308 |

OTHER PUBLICATIONS

"Remote Control of a Triac is made Easy by Using IC," Electronic Design (Publication); p. 69, Sept. 27, 1970.

G. E. SCR Manual, 4th Edition, p. 80–81, 185–189.

*Primary Examiner*—John W. Huckert
*Assistant Examiner*—L. N. Anagnos
*Attorney*—Eugene M. Whitacre

[57] ABSTRACT

An AC switch device, as for example, a silicon controlled rectifier or triac, is operably connected with an AC load and a source of alternating potential to regulate the amount of electrical power delivered to the load. Signals are applied between a first and a common terminal of a three terminal piezo-ferroelectric device to generate output signals between a second and the common terminal. The second and common terminals are connected in a circuit coupled to the AC switch device. The AC switch device is turned on or keyed into conduction when a voltage developed in the circuit reaches a predetermined level. The point in time or phase relative to the alternating potential when the predetermined voltage level occurs is controlled by adjusting the gain of the piezo-ferroelectric device.

24 Claims, 6 Drawing Figures

INVENTORS
Joseph H. McCusker
and Stuart S. Perlman.
BY David E. Pitchenik
ATTORNEY INVENTORS
Joseph H. McCusker
and Stuart S. Perlman.
BY David E. [signature]
ATTORNEY INVENTORS
Joseph H. McCusker
and Stuart S. Perlman.
BY David E. [signature]
ATTORNEY INVENTORS
Joseph H. McCusker
and Stuart S. Perlman.
BY David E. [signature]
ATTORNEY INVENTORS
Joseph H. McCusker
and Stuart S. Perlman
BY David E. [signature]
ATTORNEY INVENTORS
Joseph H. McCusker
and Stuart S. Perlman
BY David E. Pitchenik
ATTORNEY

POWER CONTROL SYSTEM EMPLOYING PIEZO-FERROELECTRIC DEVICES

The present invention relates to power control systems, and more particularly, to AC power control systems employing piezo-ferroelectric devices.

Electronic control systems for AC loads such as lights, heating elements or motor windings are often controlled by electronic switches, as for example, SCR or triac thyristor devices, operably connected with the load and a source of alternating potential. The electrical power delivered to the load is controlled by turning on or keying into conduction the switch device for a portion of the period of the alternating potential energizing the load. In this manner, the power delivered to the AC load can be regulated to any value from zero power to essentially the full power capability of the applied alternating potential.

Circuits used to control the turning on of the switching device should have analog storage properties which are adjustable, and which are stable over long periods of time. Moreover, the circuits should have the capability of repeated resettability to an adjusted condition with a retention of the condition should the power to the circuit be interrupted and thereafter reapplied. Often, this is achieved by the use of a potentiometer whose setting controls the initiation of a keying pulse to the switch device at different phase angles relative to the signal energizing the load.

It is an object of the present invention to provide a control system employing an electronically adjustable device for controlling the phase angle at which an AC switch changes conductivity states.

In accordance with the present invention, an AC load is coupled to a source of alternating potential. A switch device is operably connected with the load and source of alternating potential to regulate the amount of electrical power delivered to the load. The power is regulated by changing the conductivity condition of the switch device at different phase angles relative to the alternating potential. An electronically adjustable memory device is connected to the switch device to control the phase angle at which the switch device changes conductivity conditions.

A complete understanding of the present invention may be obtained from the following detailed description, when taken in conjunction with the accompanying drawings, in which:

FIG. 1 is a schematic circuit diagram of an AC power control system employing a piezo-ferroelectric device and embodying the present invention;

FIG. 2 *a–i* are a series of curves helpful in an understanding of the AC power control system shown in FIG. 1;

Figure 4:
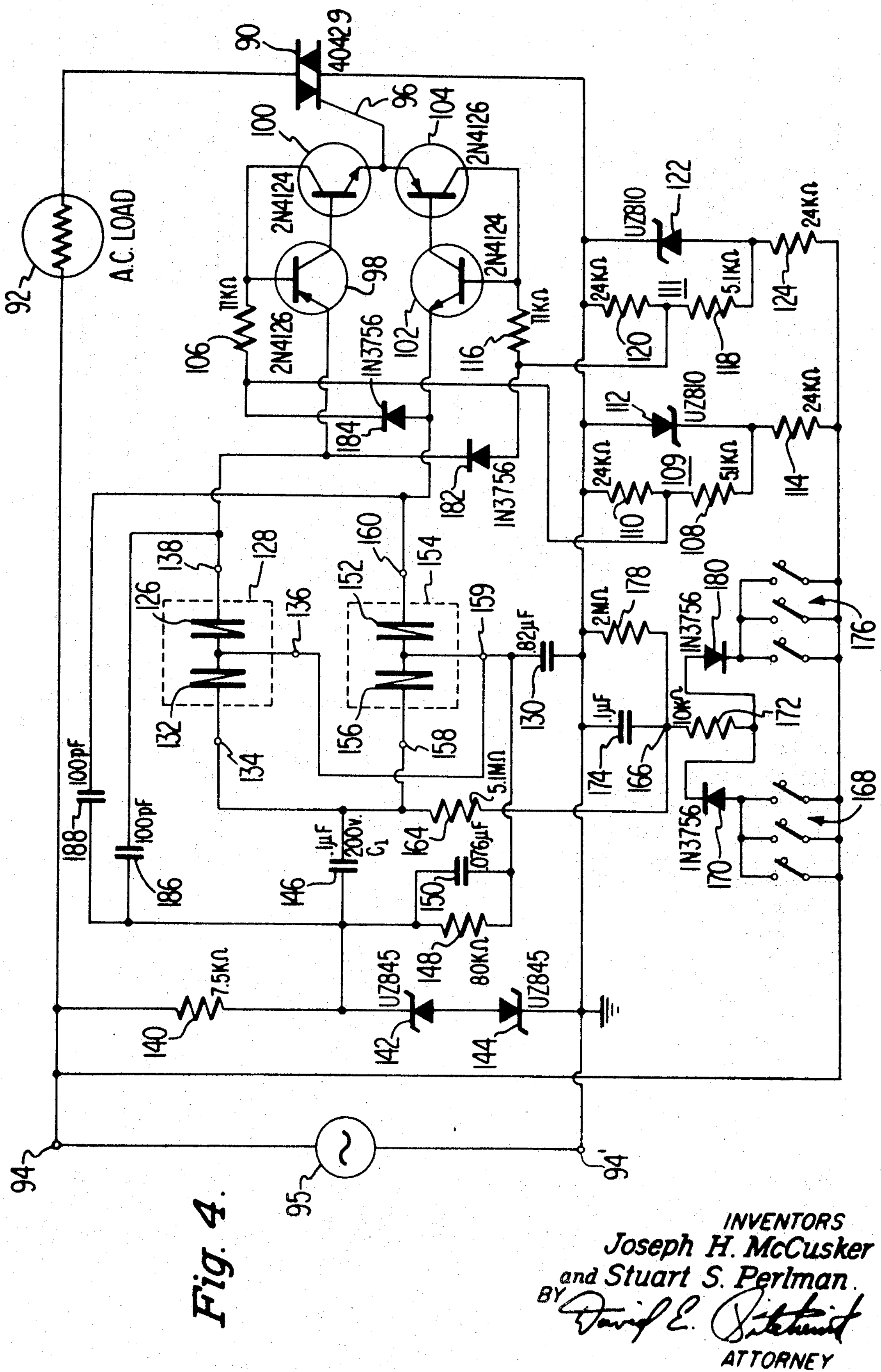
FIG. 4 is a schematic circuit diagram of a power control system embodying the present invention with temperature compensation and employing a bidirectional switch and two piezo-ferroelectric devices.
Figure 5:
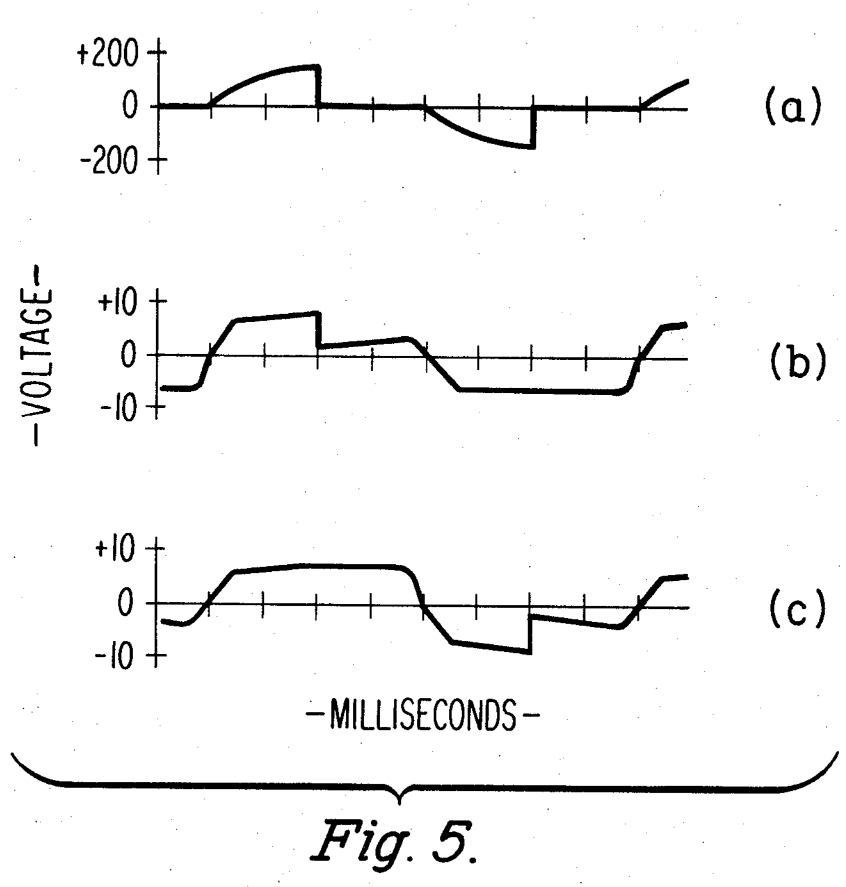
Figure 6:
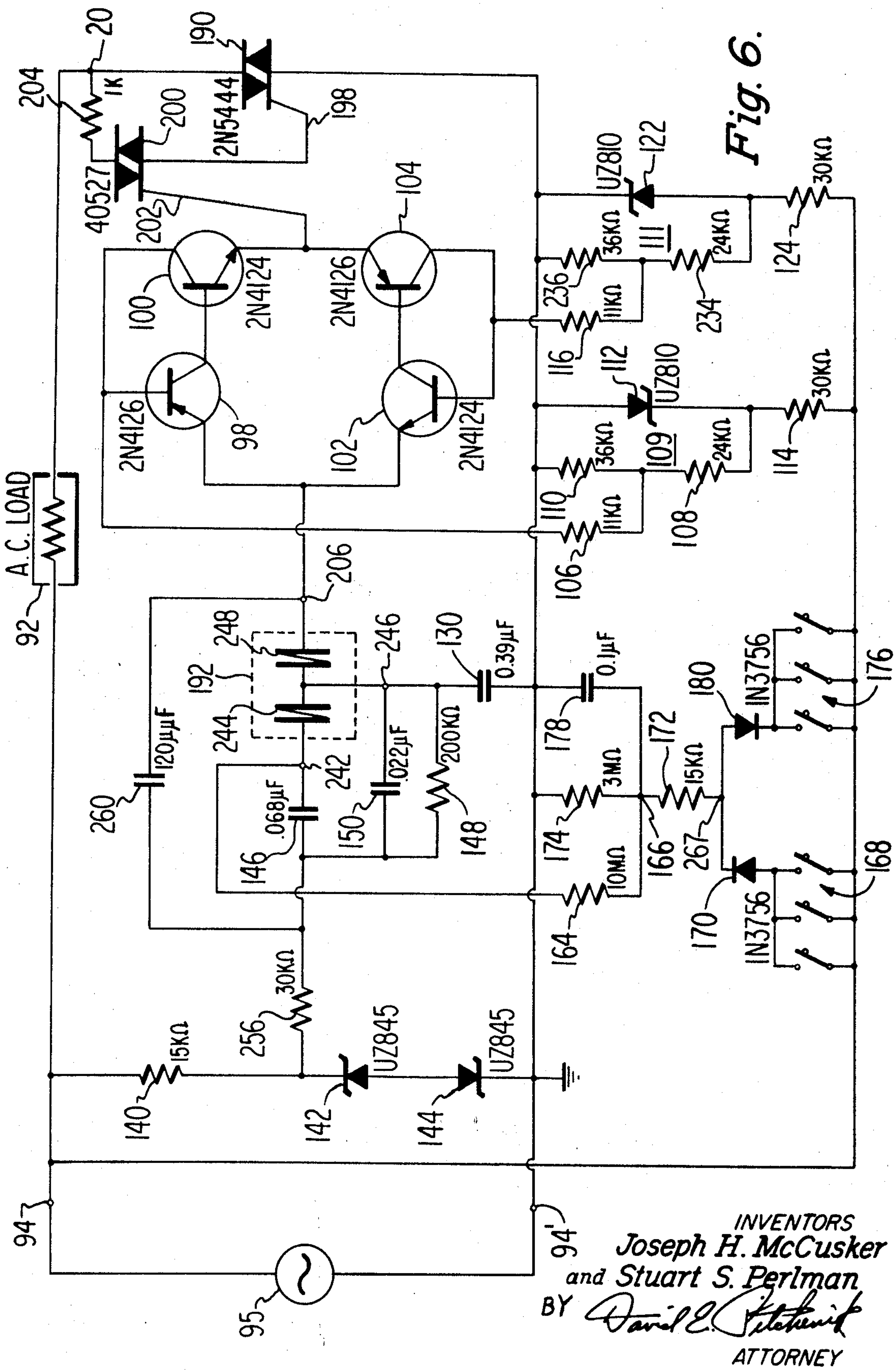

FIG. 5 *a–c* are a series of curves helpful in an understanding of the AC power control system shown in FIG. 4; and FIG. 6 is a schematic circuit diagram of a power control system embodying the present invention with temperature compensation and employing a bidirectional switch and a single piezo-ferroelectric device.

Figure 1:
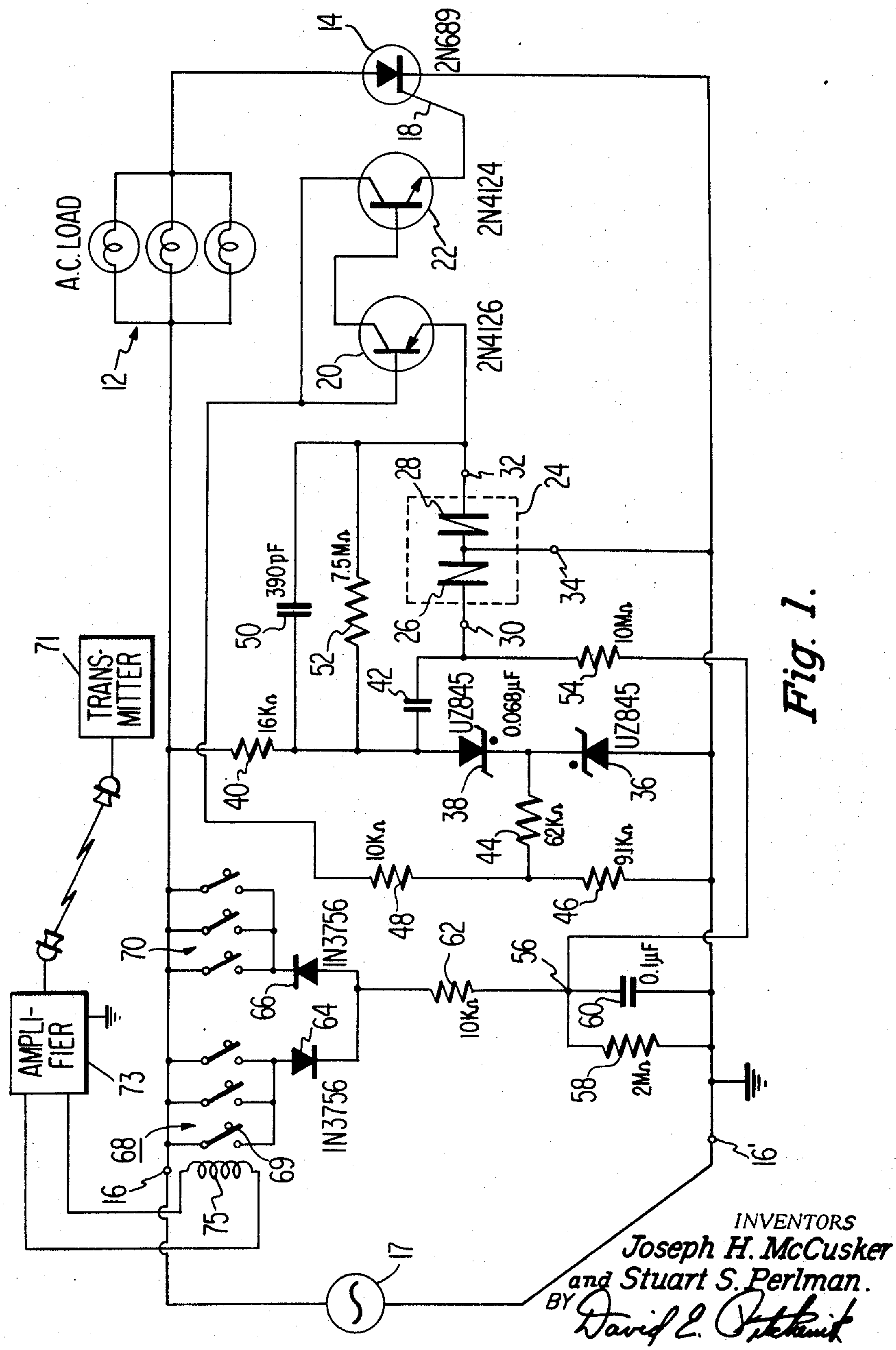

Referring now to FIG. 1, an AC load 12, comprising a plurality of parallel connected incandescent lamps, is connected in series with a silicon controlled rectifier (SCR) 14 between the terminals 16– 16′. The terminals 1 16–16′ are coupled to a 60 Hz, 1 10 volt source of alternating potential 17, with terminal 16′ connected to a fixed reference potential, shown as ground. The power delivered to the load 12, and hence the illumination provided by the incandescent lamps, in regulated by the phase angle relative to the alternating potential applied to the terminals 16–16′ at which the SCR 14 is keyed into conduction by a pulse at its gate electrode 18. SCR 14 will be rendered conductive if a sufficiently large positive voltage pulse with respect to its cathode is applied to its gate electrode 18 when a sufficiently large positive voltage is impressed on its anode relative to its cathode. When this occurs, the SCR will remain conductive so long as a positive voltage remains impressed on the anode electrode (the remainder of the positive half cycle of alternating potential following the gate pulse).

A positive voltage is coupled to the gate 18 of the SCR 14 when transistors 20 and 22 are biased into conduction. This occurs when the charge across the output element of a piezo-ferroelectric device 24 reaches a sufficient level as will be explained in greater detail hereinafter.

The piezo-ferroelectric device 24 includes a first piezoelectric element 26 and a second piezoelectric element 28. The elements, in addition to having piezoelectric properties, also have ferroelectric properties. Each element exhibits a capacitance between their respective terminals 30 and 32 and common terminal 34. The device may be similar in structure to the adaptive ferroelectric filter shown in FIG. 2 of U.S. Pat. application Ser. No. 793,872, filed Jan. 24, 1969, in the names of Stuart S. Perlman and Joseph H. McCusker, being fabricated from PZT-5H which is manufactured by the Vernitron Corporation (Piezoelectric Division), Bickford, Ohio. The material is of the family of donor doped lead zirconate-lead titanate which is treated in detail in an article entitled, "Piezoelectric Properties of Polycrystalline Lead Titanate Zirconate Compositions," by D. A. Berlincourt, C. Cmolik, and H. Jaffe, *Proceedings of the IRE*, *Volume* 4, No. 2, February, 1960. The piezo-ferroelectric device may be formed, for example, by a sandwich of a metal contact connected to the terminal 30, the piezo-ferroelectric element 26, a conductive brass center vane connected to the common terminal 34, the piezo-ferroelectric element 28 and a metal contact connected to the terminal 32. The specific dimensions of the adaptive device are as follows: width — 0.63 centimeters; height — 0.05 centimeters (including 0.016 centimeter conductive center vane); piezo-ferroelectric element length — 0.63 centimeters; and center vane length — 0.63 centimeters. A capacitance of approximately 4,500 picofarads is exhibited between each of the terminal pairs 30–34 and 32–34. The device structure is encapsulated in a casting compound to form an adaptive ferroelectric transformer as described in an article entitled, "An Adaptive Ferroelectric Transformer — A Solid State Analog Memory Device," Transactions on Electron Devices, ED-16, pages 534–540, July, 1970.

The piezo-ferroelectric device 24 has a slow rise time square wave voltage impressed across the terminals 30–34 which establishes alternating stresses in the element 26. These alternating stresses are mechanically coupled through the center vane to the piezoelectric element 28 thereby causing alternating mechanical stresses in the piezo-ferroelectric element 28 which generates a similar slow rise time square wave voltage between the metal contact connected to the terminal 32 and the center vane connected to the terminal 34. The generated voltage across the terminals 32–34 is in phase and of the same polarity as the alternating slow rise time square waveform voltage impressed across the terminals 30–34 of the device when the piezo-ferroelectric element 28 is polarized with the terminal 32 positive with respect to terminal 34 and the piezo-ferroelectric element 26 is polarized with the terminal 30 negative with respect to the terminal 34. However, the polarity and amplitude of the generated voltage also depends upon the particular geometry of the device, the mounting technique and the mode of mechanical vibration which are all a matter of choice.

The voltage gain, which is defined as the ratio of the open circuit output voltage to the input voltage, of the piezo-ferroelectric device 24 may be adjusted. The voltage gain depends upon the magnitude of the piezoelectric effect of the specific material utilized for the elements 26 and 28 as well as their dimensions and the efficiency of the mechanical coupling. However, the level of the piezoelectric effect is proportional to the ferroelectric effect in piezo-ferroelectric materials. Hence, the voltage gain is dependent upon the orientation of the ferroelectric domains in the elements 26 and 28. The piezoelectric level or effective coefficient of the elements can be adapted or adjusted, and thus controls the device gain, by selectively changing the magnitude and polarity of the polarization field associated with the ferroelectric properties of the material utilized for the elements. In this way, the device gain can be adapted or adjusted anywhere between a positive peak in-phase output signal and a negative 180° out-of-phase output signal. For subsequent descriptions throughout the specification, maximum device gain refers to the maximum peak in-phase output signal while minimum device gain refers to the maximum peak 180° out-of-phase output signal.

Maximum positive or negative polarization would exist when the ferroelectric domains over the entire area of each of the piezoelectric-ferroelectric elements 26 and 28 were aligned in one direction. However, the piezo-ferroelectric element 26 can be partially adapted or changed by pulse voltages to an intermediate value of polarization. This corresponds to a condition where the sum of the positively oriented domains and the sum of the negatively oriented domains add up to a value which differs from either the positive or negative saturation values. This sum represents the amount of remanent polarization. The device open circuit voltage gain can be varied, for either in-phase or 180° out-of-phase output signals, between 6.5 and 0 percent of the applied signal across the terminals 30–34. By selectively controlling the gain of the piezo-ferroelectric device, the point in time or phase relative to the applied alternating potential at the terminals 16– 16′ when the output piezo-ferroelectric element 28 is sufficiently charged to a voltage level to bias the transistors 20 and 22 into conduction can be controlled.

Two oppositely poled Zener diodes 36 and 38 are connected in series with a resistor 40 between the terminals 16–16′. In this manner, a slow rise time square wave voltage (approximately 90 volts peak to peak) 16–the same phase as the alternating potential applied across terminals 1 16′ is generated at the anode of the Zener diode 38. This voltage is coupled by capacitor 42 to the piezo-ferroelectric device terminal 30. The square wave voltage is impressed across the terminals 30–34 of the piezo-ferroelectric element 26 which is mechanically coupled to the piezo-ferroelectric element 28 to generate a similar square wave voltage across the terminals 32–34. The positive voltage developed at the junction of the cathodes of the Zener diodes 36 and 38 is applied across a voltage divider including the resistors 44 and 46. The junction of these resistors is connected by a resistor 48 to the base electrode of the transistor 20 and the collector electrode of the transistor 22 to establish a bias on the transistor 20 and a collector voltage on transistor 22 when the alternating potential at terminal 16 goes positive.

The square wave voltage developed at the anode of the Zener diode 38 is also coupled by the parallel connected capacitor 50 and resistor 52 to the terminal 32. The capacitor 50 and the capacitance exhibited by the piezo-ferroelectric element 28 form a voltage divider to establish a square wave voltage at the emitter of the transistor 20 of approximately 8 volts peak to peak. The resistor 52 cooperates with the capacitance of the element 28 to form an integrator circuit. The voltages developed across the element 28 (terminals 32–34) and hence, at the emitter electrode of the transistor 20, combine to form a trapezoidal waveshape voltage (see FIG. 2 *c*, *f*, and *i*).

The trapezoidal waveshape voltage is the combination of three voltage components, the square wave voltage generated by the vibration of the piezo-ferroelectric element 28, the square wave voltage coupled by capacitor 50, and an integrated voltage developed by the resistor 52 and the output capacitance of piezo-ferroelectric element 28. By adjusting the remnant polarization of the piezo-ferroelectric element 26, the gain of the piezo-ferroelectric device 24 can be controlled and the contribution to the trapezoidal waveshape voltage by the square wave voltage generated by the piezo-ferroelectric element 28 can be adjusted. By controlling the gain of the piezo-ferroelectric device 24, the point in time or phase relative to the alternating potential applied to the load 12 and SCR 14 when the trapezoidal waveshape voltage reaches an amplitude sufficient to bias the transistors 20 and 22 into conduction can be controlled.

When the voltage at the terminal 32 reaches approximately 6 volts, about 0.5 volts more positive than the bias applied to the base of transistor 20 and the collector of transistor 22, the emitter-base junction of the transistor 20 becomes forward biased. It should be noted that capacitor 50 is selected so that the base bias voltage rises to the peak value more quickly and initially is more positive than the voltage at the terminal 32. When the voltage at terminal 32 reaches approximately 6 volts, a current begins to flow through the emitter-collector electrode current path of the transistor 20 and into the base electrode of the transistor 22 which biases the transistor 22 into conduction, thereby enabling SCR 14 for conduction. When the transistors 20 and 22 are biased into conduction a current also flows through the emitter-base electrode current path of transistor 20, the collector-emitter electrode current path of transistor 22 and into the gate electrode 18 of SCR 14, thus discharging the voltage at terminal 32 toward zero. Resistors 44, 46 and 48 are sufficiently large so that the initial voltage applied to the base electrode of transistor 20 and the collector electrode of transistor 22 before conduction cannot be maintained during conduction. Thus, the emitter-base junction of the transistors remains forward biased even though the voltage at the terminal 32 drops below +6 volts as the piezo-ferroelectric element 28 discharges. The emitter-base junction of the transistors are forward biased for about one microsecond. When the voltage at the terminal 32 falls below the level required to bias the transistor 20 into conduction, the transistors 20 and 22 become nonconductive. However, SCR 14 remains conductive during the remaining portion of the positive half cycle of voltage impressed across its anode-cathode electrodes. The cycle repeats itself during the next positive half cycle.

When the voltage at the terminal 16 goes positive relative to the terminal 16', the Zener diode 38 is forward biased, and the diode 36 is operating in its Zener region. The voltage divider comprised of resistors 44 and 46 is selected to cause the base of transistor 20 to be about 5.5 volts positive with respect to ground. When the positive going voltage at the terminal 32 reaches about 6 volts relative to ground, the transistors 20 and 22 and the gate-to-cathode junction of SCR 14 conduct and provide a discharge path to ground for the output capacitance of the element 28.

When the voltage at the terminal 16 goes negative relative to the terminal 16', the diode 38 operates in its Zener region and the Zener diode 36 conducts. Thus, the base of transistor 20 is held close to ground potential When the negative going voltage at the terminal 32 reaches about 7 volts, the base-emitter diode of transistor 20 breaks down and operates in its Zener region. This action clamps the most negative voltage at terminal 32 to about −7 volts with respect to ground for the particular transistors employed.

The gain of the piezo-ferroelectric device 24 is controlled by impressing a direct control voltage across the piezo-ferroelectric element 26 (terminals 30–34). Assuming that piezoelectric element 28 had been polarized prior to insertion into the circuit with the terminal 32 being positive with respect to terminal 34, negative control voltage pulses applied between the terminal 30 and 34 will increase the gain of the piezo-ferroelectric device 24 while positive control voltage pulses will decrease the gain of the device 24.

A source of direct control voltage is coupled to the piezo-ferroelectric device terminal 30 via a resistor 54 which is connected to a junction 56 of the parallel connected resistor 58 and capacitor 60. The junction 56 is connected by a resistor 62 to the cathode of a diode 64 and the anode of a diode 66. A plurality of switches 68 connect the anode of the diode 64 to the terminal 16 while a plurality of switches 70 connect the cathode of the diode 66 to the terminal 16. The switches comprising the plurality of switches 68 and 70 can be positioned in locations remote from the remainder of the circuit to provide multiple remote locations for applying control voltages to the piezo-ferroelectric element 26 and hence to control the illumination provided by the incandescent lamps forming the AC load 12. It should be noted that any switch of the plurality of switches 68 and 70, as for example switch 69, can be actuated by signals received from wireless transmitter 71 amplified in an amplifier 73 and applied to a relay winding 75 which closes switch 69 for the duration of the transmitted signals. Moreover, the switches themselves can be eliminated and command voltage pulses from a computer or similar analyzer provided. The computer can be responsive to a manufacturing process to control power delivered to various pieces of equipment.

When one switch of the plurality of switches 68 is closed, capacitor 60 rapidly charges to provide a positive potential at the junction 56 as long as the switch remains closed. This positive voltage is coupled by the resistor 54 to the terminal 30 to provide a control voltage to change the gain of the piezo-ferroelectric device 24 to provide a lower amplitude output signal. This causes the transistors 20–22 to be biased into conduction at a later point during the positive half cycle of the alternating potential at the terminal 16. If the switch 68 is maintained closed for a sufficient period of time, the remanent polariation of the piezo-ferroelectric element 26 becomes positive. Consequently, the output signal of the piezo-ferroelectric element 28 will be 180° out of phase with respect to the square wave voltage coupled by the capacitor 50 to the emitter electrode of the transistor 20. Nevertheless, since the magnitude of the voltage coupled by the capacitor 50 is approximately 8 volts, and the maximum voltage contributed by the piezo-ferroelectric device 24 is 4 volts, the resultant square wave component of the trapezoidal waveshape voltage remains in phase with the alternating potential applied across the terminals 16–16'. When the switch 68 is open, capacitor 60 discharges through the resistor 58. Capacitor 42 and piezo-ferroelectric element 26 discharge through the series resistors 54 and 58 and the adjustment of the device gain ceases.

When one switch of the plurality of switches 70 is closed, capacitor 60 rapidly charges to establish a negative voltage at the junction 56 which is coupled by the resistor 54 to the terminal 30. This negative voltage controls the piezo-ferroelectric device 24 to provide an increased device gain. This causes the transistors 20–22 to be biased into conduction at an earlier point in the positive half cycle of alternating potential applied across the terminals 16–16'. When the switch is open, the capacitor 60 discharges through the resistor 58. Capacitor 42 and piezo-ferroelectric element 26 discharge through the series resistors 54 and 58, and the adjustment of the device gain ceases. If one of the plurality of switches 70 is maintained closed for a sufficient period of time, piezo-ferroelectric element 26 will become negatively polarized and the output signal of the piezoelectric element 28 will be in phase with respect to the square wave voltage coupled by the capacitor 50 to the emitter electrode of the transistor 20. Consequently, the resultant square wave component of the trapezoidal waveshape voltage remains in phase with the alternating potential applied across the terminals 16– 16'.

Figure 2:
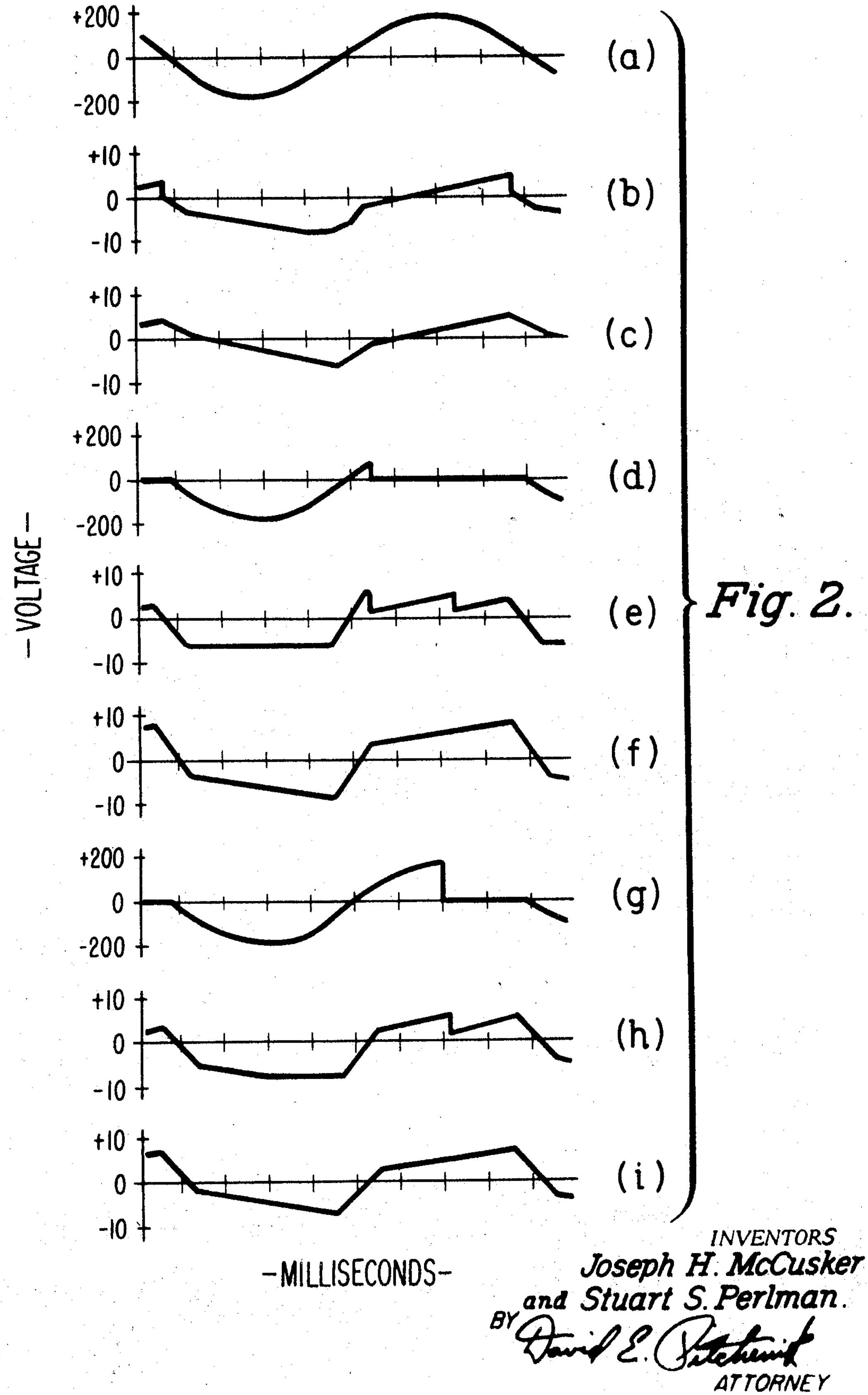

Reference is now made to FIG. 2 *a–i* which are a series of voltage waveforms helpful in an understanding of the operation of the circuit shown in FIG. 1. The curves *a*, *d*, and *g* represent the alternating potential across the anode-cathode electrodes of the SCR 14 for different conduction angles of the SCR device. The curves *b*, *e*, and *h* represent the voltage developed between the terminals 32 and 34 during a complete cycle of alternating potential across the terminals 16– 16′. Curves *c*, *f*, and *i* represent the voltage developed between the terminals 32 and 34 during a complete cycle of alternating potential when capacitor 50 and resistor 52 remain connected to terminal 32 while the emitter electrode of the transistor 20 is disconnected from terminal 32.

With the circuits connected as shown in FIG. 1, when the SCR is conducting, the voltage across the anode-cathode electrodes drops to zero and power is delivered to the load. No conduction occurs during a positive half cycle of alternating potential in FIG. 2*a*. Conduction does occur, however, during a positive half cycle of alternating potential at approximately 27° in FIG. 2*d*; and 95° in FIG. 2*g* — into the positive half cycle. These three curves depict the anode-cathode voltage conditions for a cycle of applied alternating potential with the piezo-ferroelectric device 24 adjusted to three different conditions. In FIGS. 2*d* and 2*g*, SCR conduction (zero voltage across the anode-cathode electrodes of the SCR) terminates at the end of the positive half cycle of the applied alternating potential.

No power is delivered to the AC load 12 with the piezo-ferroelectric device 24 adjusted for minimum device gain to effect the SCR anode-cathode voltage waveform shown in FIG. 2*a* because the amplitude of the voltage at the emitter electrode of the transistor 20 shown in FIG. 2*b* reaches the 6 volt firing level at a phase angle too close to 80° into the positive half cycle for conduction to be sustained. The voltage waveform developed between the terminals 32 and 34 when terminal 32 is disconnected from the emitter electrode of the transistor 20 (but not from resistor 52) and capacitor 50 and with the piezo-ferroelectric device 24 adjusted for minimum device gain is shown in FIG. 2*c*. The voltage waveform when terminal 32 is disconnected is different because the terminal 32 voltages can no longer discharge during the positive half cycles nor is it clamped to −7 volts (the Zener breakdown of the emitter-base junction of transistor 20) during part of the negative half cycles.

With the piezo-ferroelectric device 24 adjusted for maximum device gain to effect SCR anode-cathode waveform voltage as shown in FIG. 2*d*, the voltage at the emitter electrode of the transistor 20, FIG. 2*e*, reaches approximately 6 volts at 27° into the positive half cycle, and the AC load 12 is energized with almost the full available power. At this time, the voltage at the emitter electrode of the transistor 20 drops toward ground potential as the piezo-ferroelectric element discharges. After the piezo-ferroelectric element 28 has discharged (keying the SCR 14 into conduction) below approximately 1.5 to 2 volts, transistors 20 and 22 are no longer biased into conduction and the capacitance of the piezo-ferroelectric element 28 begins to recharge. The piezo-ferroelectric element 28 may charge to a point to again bias the transistors 20 and 22 into conduction after the first discharge is over. When the transistors 20 and 22 are biased into conduction, the voltage at the emitter electrode of the transistor 20 again drops toward ground potential as the piezo-ferroelectric element 28 discharges. However, since SCR 14 is already conducting at the time of second firing, the discharge has no effect. The voltage waveform developed between the terminals 32 and 34 when terminal 32 is disconnected from the emitter electrode of transistor 20 (but not from resistor 52 and capacitor 50) and with the piezo-ferroelectric device 24 adjusted for maximum device gain is shown in FIG. 2*f*.

With the piezo-ferroelectric device 24 adjusted at a point between maximum and minimum device gain to effect the voltage waveform across the anode-cathode electrodes of the SCR as depicted in FIG. 2*g*, the AC load 12 is energized with less than the full available power. As shown in FIG. 2*h*, the transistors 20 and 22 are biased into conduction at approximately 95° into the positive half cycle of alternating potential applied across the terminals 16– 16′. The voltage waveform developed between the terminals 32–34 when terminal 32 is disconnected from the emitter electrode of the transistor 20 (but not from resistor 52 and capacitor 50) and with the piezo-ferroelectric device adjusted for intermediate device gain is shown in FIG. 2*i*. A comparison of the waveshapes in FIGS. 2*b*, 2*e* and 2*h* show that the initial linear portion of the waves during the positive half cycles can be either positive or negative, depending upon the device gain.

Any power setting corresponding to phase angles between 27° to 180° can be obtained by selectively closing one switch of either plurality of switches 68 or 70. The response time, the time required for the piezo-ferroelectric device 24 to be adjusted to the particular condition, is determined by the particular device switching characteristics, the control voltage amplitude, and the magnitude of resistor 54. For the component values shown in FIG. 1, the adjustment from minimum to maximum device gain occurs, in either direction, with the direct control voltage being applied for about 3.3 seconds. In-between power settings are established by opening the depressed switch at the appropriate time. Other switching speeds can easily be obtained by changing the magnitude of resistor 54. For example, by selecting the magnitude of resistor 54 to have a value between 80 meg-ohms and 0.5 meg-ohms, the adjusting speed can be made to be (between maximum and minimum device gain) from about 20 seconds to about 0.4 seconds. However, even faster speeds are possible by increasing the switching voltage amplitude. Thus, with resistor 54 at 0.5 meg-ohms and an adjusting voltage of ±275 volts DC, the switching time between maximum and minimum device gain is roughly 0.03 seconds.

Figure 3:
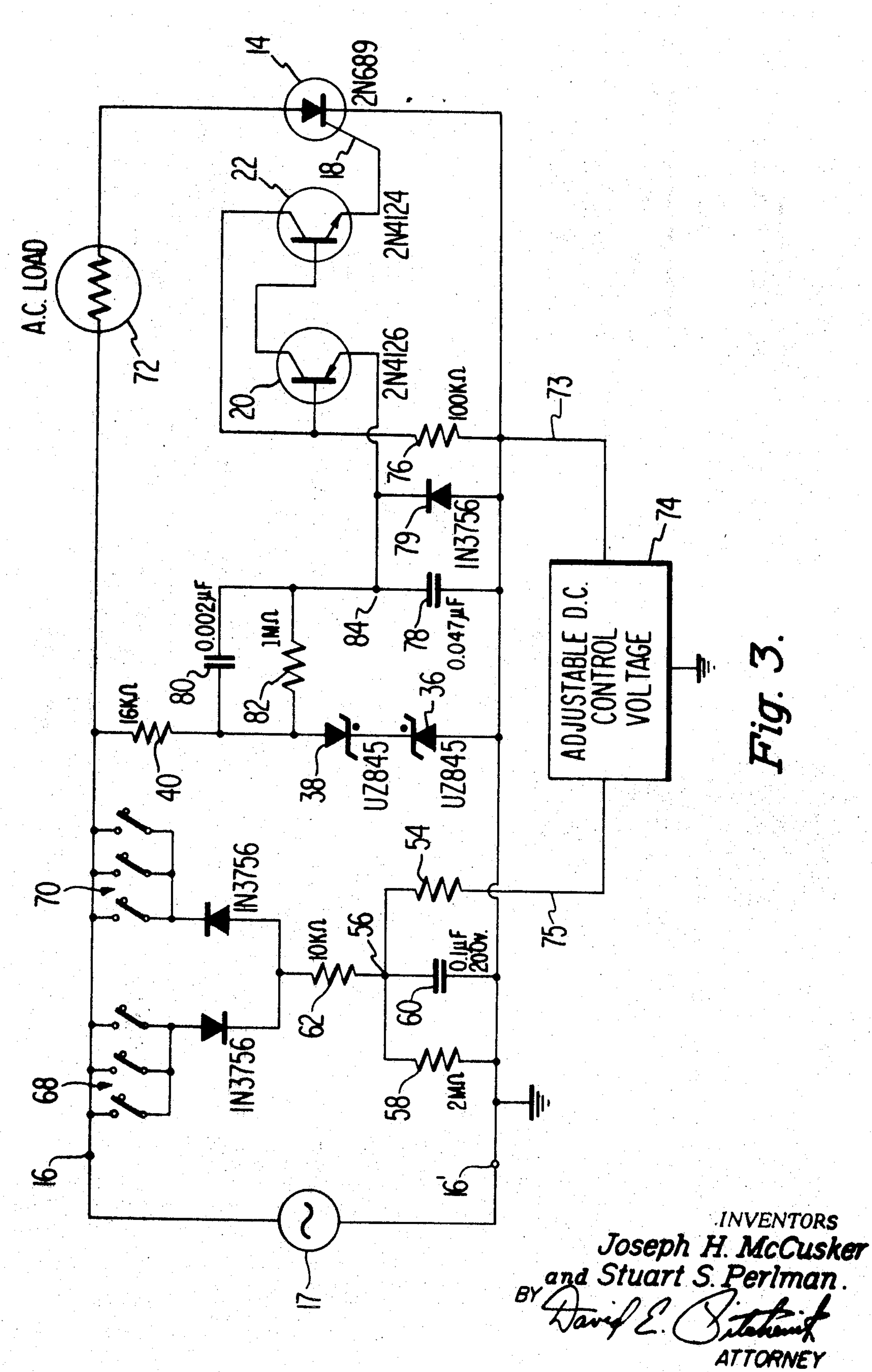
FIG. 3 is a schematic circuit diagram of an alternative embodiment of the AC power control system shown in FIG. 1 wherein an adaptable or adjustable DC voltage regulates the power delivered to an AC load.

Reference is now made to FIG. 3 wherein the same reference numerals used in FIG. 1 designate similar elements. The phase angle relative to the alternating potential applied to the terminal 16–16′ when the SCR 14 is turned on or keyed into conduction is controlled by the amplitude of a voltage which sets the base bias and collector voltage level for transistors 20 and 22, respectively. A source of adjustable DC voltage 74 provides a bias voltage on lead 73 for the transistors 20 and 22. The amplitude of the DC voltage is adjusted by applying the voltage developed at the junction 56 to the source of adjustable DC voltage 74 via the resistor 54 and lead 75 when a given one of the pluality of switches 68 and 70 is closed. One suitable adjustable control voltage source is disclosed in U.S. patent application 793,872, supra. Other types of DC voltage sources can be employed to regulate the power delivered to the AC load. A time variable amplitude voltage, for example, is suitable and the power delivered to the AC load could be made to vary in accordance with a predetermined voltage waveshape as the amplitude of the time variable voltage varies above and below the level which will cause the transistors 20 and 22 to be biased into conduction.

The DC output voltage from the source of adjustable DC voltage 74 is applied via the lead 73 and the resistor 76 to the base electrode of the transistor 20 and the collector electrode of the transistor 22. The amplitude of this bias voltage determines the voltage level necessary at the emitter electrode of the transistor 20 to bias the transistors 20 and 22 into conduction. By adjusting the bias voltage level, the point in time or phase relative to the alternating potential applied to the terminals 16–16' when the transistors 20 and 22 are biased into conduction can be controlled. When transistors 20 and 22 are biased into conduction, the charge on capacitor 78, which replaces the output piezo-ferroelectric element 28 shown in FIG. 1, discharges through the transistors and into the gate electrode of the SCR 14 keying the device into conduction to thereby regulate the power delivered to the AC load 72.

The capacitor 78 is coupled to the anode of the Zener diode 38 by a capacitor 80 and a resistor 82. The capacitors 78 and 80 form a voltage divider to establish a square wave voltage at the junction 84 which is coupled to the emitter electrode of the transistor 20. Resistor 82 cooperates with capacitor 78 to provide an integrated square wave voltage across capacitor 78. The square wave voltage and the integrated square wave voltage combine to provide a trapezoidal waveshape voltage across the capacitor 78. During negative half cycles of the applied alternating potential the voltage across capacitor 78 is clamped to essentially ground potential by the diode 79. The particular point in time or phase when the amplitude of the positive trapezoidal waveshape voltage is sufficient to bias the transistors 20 and 22 into conduction is determined by the bias voltage level; that is, the amplitude of the DC voltage from the source of adjustable voltage 74 (approximately +3 to +9.5 V).

Reference is now made to FIG. 4 wherein a circuit having improved temperature stability characteristics compared to the circuit of FIG. 1 is shown and wherein an AC bidirectional switch device, triac 90, is connected in series with an AC load 92 between the terminals 94–94'. A 110 volt, 60 Hz source of alternating potential 95 is coupled between the terminals 94–94', with terminal 94' being connected to a fixed reference potential, shown as ground. The power delivered to the AC load 92 is determined by the point in time or phase relative to the alternating potential applied across the terminals 94–94' when triac 90 is turned on or keyed into conduction. Triac 90 will be keyed into conduction by a positive voltage pulse (with respect to ground) applied to its gate electrode 96 during positive half cycles of alternating potential at the terminals 94–94' and a negative pulse (with respect to ground) during negative half cycles of the alternating potential.

Positive pulses are applied to the gate electrode 96 of the triac when the transistors 98 and 100 are biased into conduction, while negative pulses are applied to the gate electrode 96 when the transistors 102 and 104 are biased into conduction. A positive pulsed DC bias voltage of approximately +7 volts is applied to the base electrode of the transistor 98 and the collector electrode of the transistor 100 from a source of positive pulsed DC potential 109 via the resistor 106. The source of positive pulsed potential 109 includes the voltage divider resistors 108 and 110 connected across the Zener diode 112. The Zener diode 112 and a resistor 114 are connected in series between the terminals 94 and 94'.

A negative pulsed DC bias potential of approximately −7 volts is applied to the base electrode of the transistor 102 and the collector electrode of the transistor 104 from a source of pulsed negative DC potential 111 via the resistor 116. The source of pulsed negative DC potential includes the voltage divider resistors 118 and 120 connected across Zener diode 122. The Zener diode 122 is connected in series with a resistor 124 across the terminals 94–94'.

Positive voltage pulses are applied to the gate electrode 96 of triac 90 when the voltage developed across the capacitance of the output piezo-ferroelectric element 126 of the piezo-ferroelectric device 128 and series connected capacitor 130 is sufficient (approximately +7.5 volts) to bias the transistors 98 and 100 into conduction. At this time, the voltage at terminal 138 discharges toward zero through the conducting transistors 98 and 100 into the gate electrode 96 of the triac 90.

The alternating potential at the terminals 94–94'' is applied across the series connection of a resistor 140 and two oppositely poled Zener diodes 142 and 144. The 90 volt peak to peak slow rise time square wave voltage developed at the cathode of the Zener diode 142 is applied to the terminal 134 of the piezo-ferroelectric device 128 by a capacitor 146. This square wave voltage is applied across the series capacitance of the piezo-ferroelectric element 132 and the capacitor 130. However, since the capacitance of the element 132 is approximately 4,500 picofarads, the vast majority of the voltage is developed across the piezo-ferroelectric element 132 which generates alternating stresses in the element. The vibrations of the piezo-ferroelectric element 132 are mechanically coupled to the piezo-ferroelectric element 128 which generates a square wave voltage. The generated voltage across the terminals 138–136 is in phase and of the same polarity as the slow rise time square wave voltage impressed across the terminals 134–136 when the piezo-ferroelectric element 126 is polarized with the terminal 138 positive with respect to terminal 136 and the piezo-ferroelectric element 132 is polarized with terminal 134 negative with respect to the terminal 136. However, the polarity and amplitude of the output voltage also depends upon the particular geometry of the device, the mounting technique and the mode of mechanical vibration which are all a matter of choice.

The square wave of voltage developed at the cathode of the Zener diode 142 is also coupled to the capacitor 130 via the parallel connected resistor 148 and capacitor 150. The capacitor 150 cooperates with the capacitor 130 to form a voltage divider to develop a square wave voltage across the capacitor 130. The resistor 148 cooperates with capacitor 130 to integrate the square wave voltage. The square wave and integrated square wave voltage across the capacitor 130 combine to form a trapezoidal waveshape voltage. The trapezoidal waveshape voltage developed across the capacitor 130 further combines with the voltage generated across the piezo-ferroelectric element 126 to provide a trapezoidal waveshape voltage of greater or lesser magnitude between the terminal 138 and the grounded side of the capacitor 130.

By adjusting the gain of the piezo-ferroelectric device 128, the amplitude of the square wave component of the trapezoidal waveshape voltage developed between the terminal 138 and the grounded side of the capacitor 130 can be controlled. When the voltage at the terminal 138 is of sufficient magnitude (approximately +7.5 volts), transistor 98 is biased into conduction which in turn biases transistor 100 into conduction. At this time, the voltage at terminal 138 discharges through the conducting transistors and into the gate electrode 96 of the triac 90. After the triac 90 has been turned on or keyed into conduction, the voltage at the terminal 138 reduces to such a level that the transistors 98 and 100 become non-conductive.

When the transistors 98 and 100 are biased into conduction a current flows through the emitter-base electrode current path of transistor 98, the collector-emitter electrode current path of transistor 100 and into the gate electrode 96 of triac 90, thus discharging the voltage at terminal 138 toward zero. Resistors 106, 108 and 110 are sufficiently large so that the initial voltage applied to the base electrode of the transistor 98 and the collector electrode of the transistor 100 before conduction cannot be maintained during conduction. Thus, the emitter-base junction of the transistors remains forward biased even though the voltage at the terminal 138 drops below +7.5 volts as the piezo-ferroelectric element 126 discharges. The emitter-base junction of the transistors are forward biased for about one microsecond. When the voltage at the terminal 138 falls below the level required to bias the transistor 98 into conduction, the transistors 98 and 100 become nonconductive. However, triac 90 remains conductive during the remaining portion of the positive half cycle of voltage impressed across its anode-cathode electrodes.

Negative pulses are applied to the gate electrode 96 of triac 90 when the voltage developed across the capacitance of the output piezo-ferroelectric element 152 of the piezo-ferroelectric device 154 and series connected capacitor 130 is sufficient (approximately −7.5 volts) to bias the transistor 102 into conduction. The voltage at terminal 160 discharges at this time through the conducting transistors 102 and 104 into the gate electrode 96 of the triac 90.

The piezo-ferroelectric device 154 cooperates with the transistors 102 and 104 in a manner similar to the cooperation between the piezo-ferroelectric device 128 and the transistors 98 and 100. The piezo-ferroelectric element 152 is polarized with terminal 160 postive with respect to the terminal 159 and, thus, when the piezo-ferroelectric element 156 is polarized with the terminal 158 negative with respect to terminal 159, the generated voltage across the terminals 160–159 is in phase and of the same polarity as the slow rise time square wave voltage impressed across the terminals 158–159. Triac 90 is turned on or keyed into conduction during positive half cycles of the applied alternating potential at the terminals 94–94′ by the discharge from terminal 138 to ground caused by the voltage across the capacitances of the piezo-ferroelectric element 126 and series connected capacitor 130 and for negative half cycles by the discharge from terminal 160 to ground caused by the voltage across the capacitances of the piezo-ferroelectric element 152 and series connected capacitor 130.

For positive half cycles of the applied alternating potential, the voltage developed btween the terminal 138 and the grounded side of the capacitor 130 is limited by the voltage level necessary to bias the transistors 98 and 100 into conduction. Similarly, for the negative half cycles of the applied alternating potential, the voltage developed between the terminal 160 and the grounded side of the capacitor 130 is limited by the voltage level necessary to bias the transistors 102 and 104 into conduction. However, for the opposite half cycles of applied potential, these conditions do not obtain for the respective piezo-ferroelectric devices 128 and 154. A diode 182 is connected between the resistor 116 and the terminal 138 while a diode 184 is connected between the resistor 106 and terminal 160. These diodes clamp the peak negative voltage developed at the terminal 138 and the peak positive voltage developed at the terminal 160 to approximately −7 and +7 volts, respectively. When the potential provided by the sources of potential 109 and 111 are both approximately zero, the potential at terminals 138 and 160 become clamped to ground. If the voltage at terminal 138 was positive it would discharge toward zero through the series connection of the emitter-base electrode current path of transistor 98 and resistor 106. If the voltage at terminal 138 was negative, it would discharge toward zero through the forward biased diode 182. The voltage at terminal 160 is similarly clamped to ground through the series connection of the emitter-base electrode current path of transistor 102 and resistor 116 or through the forward biased diode 184.

The voltage contribution of the piezo-ferroelectric elements 126 and 152 to the voltage developed between the terminals 138 and 160 and ground is controlled by adjusting the gain of each piezo-ferroelectric device. By increasing the gain of the piezo-ferroelectric devices, the amplitude of the square wave component of the trapezoidal waveshape voltage is increased and the voltage level necessary to bias the transistors 98 and 100 (for positive half cycles) or the transistors 102 and 104 (for negative half cycles) into conduction occurs earlier in point of time or phase relative to the alternating potential applied across the terminals 94–94′. On the other hand, by decreasing the gain of the piezo-ferroelectric devices, the amplitude of the square wave component of the trapezoidal waveshape voltage is reduced and, thus, the voltage level necessary to bias the transistors into conduction occurs later in point of time or phase relative to the alternating potential applied across the terminals 94–94′. Increasing the gain of the piezo-ferroelectric devices turns on or keys the triac 90 into conduction earlier in the positive and negative half cycles of alternating potential applied between the terminals 94–94′ and causes increased power to be delivered to the AC load 92. Decreasing the gain of the piezo-ferroelectric devices causes the triac 90 to be turned on or keyed into conduction later in the positive and the negative half cycles of alternating potential applied between the terminals 94 and 94′ which reduces the power delivered to the AC load 92.

A direct control voltage is applied to both the terminals 134 and 158 simultaneously via a resistor 164 which is coupled to a junction 166. A positive DC voltage is developed at the junction 166 when one of the plurality of switches 168 is closed and a negative DC control voltage is developed at the junction 166 when one of the plurality of switches 176 is closed. Closing one of the plurality of switches 168 biases the diode 170 into conduction during positive half cycles of the alternating potential applied across the terminals 94–94', permitting a current to flow from the terminal 94 through the diode 170 and resistor 172 to charge the capacitor 174 positively. When the closed one of the plurality of switches 168 is opened, capacitor 174 discharges through the resistor 178; capacitor 146 and the piezo-ferroelectric elements 132 and 156 discharge through the series resistors 164 and 178.

Closing one of the plurality of switches 176 permits a current to flow during negative half cycles of the alternating potential applied across the terminals 94–94', from terminal 94 through the diode 180 and the resistor 172 to charge the capacitor 174 negatively. When the closed one of the plurality of switches 176 is opened, capacitor 174 discharges through resistor 178; capacitor 146 and the piezo-ferroelectric elements 132 and 156 discharge through the series resistors 164 and 178.

By selectively closing any given switch of the plurality of switches 168 and 176, the gain of the piezo-ferroelectric devices 128 and 154 can be adjusted to control the point in time or phase relative to the alternating potential applied to the terminals 94–94' when the triac 90 is turned on or keyed into conduction by a voltage pulse. In this manner, the power delivered to the load can be adjusted between substantially zero power and full available power from the applied alternating potential.

The circuit shown in FIG. 4 has improved temperature stability during operation as compared to the circuit shown in FIG. 1. The circuit of FIG. 4 minimizes the effects of the temperature dependencies of the capacitances of the piezo-ferroelectric elements, which may be as much as one percent per degree centigrade for the particular piezo-ferroelectric materials. The improved temperature stability results because of capacitor 130. The nonadjustable portion of the summing to generate the trapezoidal waveshape voltage is performed across capacitor 130, a temperature stable capacitor whose voltage is series added to the adjustable output signal of the piezo-ferroelectric devices 128 and 152. Additional temperature stability may be derived from the utilization of the surface mounting technique for the piezo-ferroelectric devices described in U.S. Patent application Ser. No. 13,134, entitled, "Fabrication Method Yielding Improved Temperature Stability Characteristics for Adaptive Ferroelectric Transformers," filed Apr. 5, 1971, in the names of Stuart Stanley Perlman and Joseph Henry McCusker and assigned to the RCA Corporation.

Capacitor 130 cooperates with capacitor 150 to form a voltage divider for the slow rise time square wave voltage at the cathode of Zener diode 142. The resistor 148 cooperates with the capacitor 130 to establish an integrated square wave voltage across the capacitor 130. The square wave and integrated square wave voltage combine to form a trapezoidal waveshape voltage which is essentially temperature stable. The output signals generated by the piezo-ferroelectric elements 126 and 152, respectively, are series added to the trapezoidal waveshape signal across the capacitor 130 to be applied to the emitter electrode of the transistors 98 and 102, respectively.

The use of the capacitor 130 as the summing capacitor eliminates a major cause of temperature instability for the firing angle of the AC switching device. Another cause of instability, however, arises from the temperature variation of the amplitude of the square wave input signal to the piezo-ferroelectric devices which results from the temperature dependence of the Zener diodes 142 and 144. Temperature compensation of this effect can be partially accomplished by feeding a small temperature dependent in-phase signal to the output terminal, 138 and 160, respectively, of the piezo-ferroelectric devices 128 and 152 through the capacitors 186 and 188. As the temperature increases, the capacitance of the piezo-ferroelectric elements 126 and 152 increases causing the in-phase signal to decrease roughly by the same amount as the increase in the signal across the Zener diodes.

Other forms of temperature compensation can also be employed to improve the performance of the circuit shown in FIG. 1. Instead of using the capacitor summing technique (capacitor 130, FIG. 4), it is possible to obtain compensation by replacing capacitor 50, shown in FIG. 1, by a ferroelectric element with temperature properties matching that of the piezo-ferroelectric element 28. The result would be a temperature stable in-phase signal at the output terminal 32 of the piezo-ferroelectric device. The resistance of resistor 52, however, also has to be varied in order to maintain a constant resistor 42, capacitor 28 integrating time constant. This can be accomplished by employing a thermistor-resistor combination instead of a pure resistor. Such compensation techniques are, however, generally inferior to that of the capacitor summing technique because of the expense of the components involved and the large temperature variations required of these components to compensate for the approximate one percent per degree centigrade variation in the piezo-ferroelectric device element capacitances.

Other thermistor-resistor circuits can also be employed to obtain temperature compensation. For example, a thermistor-resistor combination voltage divider circuit can be placed directly across the Zener diodes 36 and 38. The output signal from the voltage divider can be set to increase with increasing temperature. If this signal is used to drive the circuit at the junction of resistor 52 and capacitor 50, the signal developed across the piezo-ferroelectric element 28 can be compensated to adjust for the temperature variations of the output capacitance of the piezo-ferroelectric elements. Again, as in the case of the other thermistor circuits, the thermistor-resistor voltage divider circuit has to provide an output signal with wide temperature variations in order to compensate for the wide temperature variations of the output capacitance of the piezo-ferroelectric element 28. It should be noted, of course that the need for temperature compensation is dependent upon the particular materials used in the piezo-ferroelectric devices.

Reference is now made to FIG. 5 *a–c* which are a series of waveforms helpful in an understanding of the operation of the circuit shown in FIG. 4. Curve 5*a* represents the alternating potential across the triac 90. When the triac is conducting, the voltage across the device drops towards zero and power is delivered to the load. The piezo-ferroelectric devices 128 and 154 are adjusted so that conduction begins at approximately 90° into the positive and negative half cycles of alternating potential applied across the triac 90. The waveform shown in FIG. 5*b* represents the voltage developed between the emitter electrode of the transistor 98 and ground. As is apparent, for positive half cycles, the voltage rises to approximately +7.5 volts when it is sufficient to bias the transistors 98 and 100 into conduction. At this time, the voltage at terminal 138 discharges toward zero potential. This occurs at a phase of approximately 90° into the positive half cycle relative to the alternating potential applied across the terminals 94–94'. The voltage thereafter begins to rise but fails to reach the level necessary to again bias the transistors 98 and 100 into conduction. During the negative half cycles of alternating potential, the voltage developed between the emitter electrode of the transistor 98 and ground is clamped at approximately −7 volts.

The waveform shown in FIG. 5*c* represents the voltage developed between the emitter electrode of the transistor 102 and ground. During positive half cycles, the voltage is clamped at approximately +7 volts. For the negative half cycle of applied alternating potential, however, the voltage rises in magnitude to approximately −7.5 volts which is sufficient to bias the transistors 102 and 104 into conduction. At this time, the voltage at terminal 160 discharges toward zero potential. This occurs at a phase of approximately 90° into the negative half cycle relative to the alternating potential applied between the terminals 94–94'. The voltage thereafter slowly begins to rise but fails to reach a level sufficient to again bias the transistors 102 and 104 into conduction.

Reference is now made to FIG. 6 wherein the same reference numerals used in FIG. 4 designate similar elements. A low and a high power bidirectional AC switch, triacs 200 and 190, respectively, are controlled by a single piezo-ferroelectric device 192. The circuit employs a summing capacitor 130 and a capacitor 260 connected between the resistor 256 and terminal 206 to provide similar temperature compensation techniques to those utilized in the circuit of FIG. 4. Triac 190 is connected in series with the AC load 92 between the terminals 94–94'.

Triac 190 is a high power thyristor such as a 2N5444 (40 amperes) triac which may require a longer current pulse at its gate electrode 198 to be turned on or keyed into conduction than can be provided from the discharge of the piezo-ferroelectric device 192. Consequently, a second triac 200 of lower power rating is connected in series with a resistor 204 between the junction 201 and the gate electrode of the triac 190. The discharge of the piezo-ferroelectric device 192 is sufficient to turn on or key the triac 200 into conduction which in turn turns on or keys the high power triac 190 into conduction. The positive and negative voltage pulses which are applied to the gate electrode 202 and turn on or key triac 200 into conduction occur when the voltage at terminal 206 discharges through either of the conducting transistor pairs 98 and 100 or 102 and 104. The piezo-ferroelectric device 192 may be identical in construction and polarization to piezo-ferroelectric device 128 shown in FIG. 4 and described above.

By adjusting the gain of the piezo-ferroelectric device 192, the amplitude of the square wave component of the trapezoidal waveshape voltage developed between the terminal 206 and ground can be controlled. When the voltage at the terminal 206 is of a sufficient magnitude, approximately ±6.5 volts, one of the transistor pairs 98 and 100 or 102 and 104 will be biased into conduction. At this time, the voltage at terminal 206 discharges toward zero through the conducting transistors and into the gate electrode of the triac 200. The triac 200 turns on or keys into conduction and in turn keys the triac 190 into conduction. After the triac 200 has been turned on, the voltage at the terminal 206 becomes sufficiently reduced such that the conducting transistors become non-conductive. Nevertheless, the triac 190 remains conductive for the remainder of the positive or negative half cycle of alternating potential, as the case may be. Triac 200, however, turns off when triac 190 is keyed into conduction because the voltage between its main terminals becomes insufficient to sustain conduction.

The voltage contribution of the piezo-ferroelectric element 248 to the voltage developed between the terminal 206 and ground during either positive or negative half cycles of the alternating potential applied between the terminals 94–94' is controlled by adjusting the gain of the piezo-ferroelectric device 192. By increasing the gain of the piezo-ferroelectric device 192, the amplitude of the square wave component of the trapezoidal waveshape voltage is increased and the voltage level necessary to bias the transistors 98 and 100 or 102 and 104 into conduction for positive and negative half cycles of the applied alternating potential, respectively, occurs earlier in point of time or phase relative to the alternating potential. By decreasing the gain of the piezo-ferroelectric device 192, the amplitude of the square wave component of the trapezoidal waveshape voltage is reduced, and thus, the voltage level necessary to bias the transistors into conduction occurs later in point of time or phase relative to the alternating potential.

Where the piezo-ferroelectric element 248 is polarized with terminal 206 negative with respect to terminal 246, a positive control voltage applied to the piezo-ferroelectric element 244 for a sufficient period of time results in a square wave voltage being generated by piezo-ferroelectric element 248 (terminals 206–246) which is of the same polarity as the square wave voltage developed at the cathode of the Zener diode 142. On the other hand, a negative control voltage applied to the piezo-ferroelectric element 244 for a sufficient period of time results in a square wave voltage being generated by piezo-ferroelectric element 248 (terminals 206–246) which is of opposite polarity to the square wave voltage developed at the cathode of the Zener diode 142. However, where piezo-ferroelectric element 248 is polarized with terminal 206 positive with respect to terminal 246, the effects of the positive and negative control voltages are reversed. The polarity and amplitude of the voltage generated by the piezo-ferroelectric element 248 is also dependent upon the particular geometry of the device, the mounting technique and mode of mechanical vibration which are all a matter of choice. Nevertheless, regardless of the polarity of square wave voltage generated by piezo-ferroelectric element 248, the magnitude of the square wave voltage coupled to the capacitor 130 through capacitor 150 is sufficient to insure that the square wave component of the trapezoidal voltage at terminal 206 always remains in phase with the square wave voltage developed at the cathode of the Zener diode 142.

For positive half cycles of the applied alternating potential, the voltage developed between the terminal 206 and ground is limited by the voltage level necessary to bias the transistors 98 and 100 into conduction. Similarly, for negative half cycles of the applied alternating potential, the voltage developed between the terminal 206 and ground is limited by the voltage level necessary to bias the transistors 102 and 104 into conduction. Consequently, no clamping diodes, like diodes 182 and 184 employed in the circuit of FIG. 4, are required in the circuit of FIG. 6. Moreover, the sources of pulsed DC potential 109 and 111 are selected to be below the actual Zener breakdown potential, base to emitter, of the transistors 98 and 102 so that the breakdown potential is not significant to the circuit operation.

What is claimed is:

1. A power control system, comprising:

an AC load coupled to a source of alternating potential;

a switch device operably connected with said AC load and said source of alternating potential to regulate the amount of electrical power delivered by said source of alternating potential to said load, said power being regulated by changes in the conductivity condition of said switch device at a selected phase angle relative to the alternating potential;

a piezo-ferroelectric memory device electronically adjustable to exhibit a range of different conditions and connected to said switch device to control the phase angle at which said switch device changes conductivity conditions, the phase angle at which said device changes conductivity being controlled by electronically adjusting said electronically adjustable memory device to different conditions; and control means coupled to said piezo-ferroelectric memory device operable, upon actuation, to adjust said device to different conditions.

2. A power control system as defined in claim 1 wherein said control means are responsive to a remotely generated signal of a predetermined frequency to adjust said device to different conditions.

3. A power control system as defined in claim 1 wherein said control means includes a plurality of switches, each of which is operable to actuate said control means.

4. A power control system as defined in claim 1 wherein said memory device has voltage gain characteristics which are electronically adjustable to exhibit said range of different conditions.

5. A power control system as defined in claim 4 wherein said memory device voltage gain characteristics when adjusted within said range of conditions is stable over long periods of time.

6. A power control system, comprising:

an AC load coupled to a source of alternating potential;

a switch device having first and second main electrodes and a gate electrode, said first and said second main electrodes operably connected with said AC load and said source of alternating potential to regulate the amount of electrical power delivered to said AC load from said source of alternating potential by changes in the impedance exhibited between said first and said second main electrodes controlled by a bias voltage applied to said gate electrode at a selected phase angle relative to the alternating potential;

a piezo-ferroelectric device including a first piezoelectric element mechanically coupled to a second piezoelectric element, one of said first and said second piezoelectric elements having ferroelectric properties;

means for applying electrical signals to said first piezoelectric element;

said second piezoelectric element connected in a circuit coupled to the gate electrode of said switch device so that a bias voltage is applied to the gate electrode of said switch device when a voltage developed in said circuit reaches a predetermined level; and control means coupled to the ferroelectric one of said first and said second piezoelectric elements operable, upon actuation, to electronically adjust said piezo-ferroelectric device to control the phase angle relative to said alternating potential when said predetermined voltage level occurs.

7. A power control system, comprising:

an AC load coupled to a source of alternating potential;

a switch device having first and second main electrodes and a gate electrode, said first and said second main electrodes operably connected with said AC load and said source of alternating potential to regulate the amount of electrical power delivered to said AC load from said source of alternating potential by changes in the impedance exhibited between said first and said second main electrodes controlled by a bias voltage applied to said gate electrode at a selected phase angle relative to the alternating potential;

a piezo-ferroelectric device including a first piezoelectric element mechanically coupled to a second piezoelectric element, one of said first and said second piezoelectric elements having ferroelectric properties;

means for applying electrical signals to said first piezoelectric element;

said second piezoelectric element connected in a circuit coupled to the gate electrode of said switch device so that a bias voltage is applied to the gate electrode of said switch device when a voltage developed in said circuit reaches a predetermined level;

means connected between said signal applying means and said circuit for coupling said electrical signals to said circuit and cooperating with said circuit such that the coupled signals are integrated and wherein the voltage developed by said second piezoelectric element and the electrical signals coupled to said circuit are combined in said circuit to create a signal whose amplitude linearly increases over a portion of each cycle of alternating potential; and control means coupled to the ferroelectric one of said first and said second piezoelectric elements operable, upon actuation, to electronically adjust said piezo-ferroelectric device to control the phase angle relative to said alternating potential when said predetermined voltage level occurs.

8. A power control system as defined in claim 7 wherein said control means is actuatable to adjust said piezo-ferroelectric device to change the gain of said device in a first direction such that the voltage amplitude of the linearly sloped portion of said created signal is shifted in a direction to cause the bias voltage to be applied to the gate electrode of said switch device earlier during a cycle of alternating potential and said control means is also actuatable to adjust said piezo-ferroelectric device to change the gain of said device in a second direction such that the voltage amplitude of the linearly sloped portion of said created signal is shifted in a direction to cause the bias voltage to be applied to the gate electrode of said switch device later during a cycle of alternating potential.

9. A power control system as defined in claim 8 wherein said means connected between said signal applying means and said circuit additionally cooperates with said circuit such that the linearly sloped portion of said created signal is of one polarity with respect to a fixed reference potential for all gain adjustments of said piezo-ferroelectric device.

10. A power control system as defined in claim 9 wherein said control means includes a source of positive potential and a source of negative potential, said positive potential applied to the ferroelectric one of said first and said second piezoelectric elements when one of a first plurality of switches is closed and said negative potential applied to the ferroelectric one of said first and said second piezoelectric elements when one of a second plurality of switches is closed.

11. A power control system as defined in claim 10 wherein at least one switch of said first and said second plurality of switches is operable by the remote transmission of a signal of a predetermined frequency.

12. A power control system, comprising:

an AC load coupled to a source of alternating potential;

a switch device having first and second main electrodes and a gate electrode, said first and said second main electrodes operably connected with said AC load and said source of alternating potential to regulate the amount of power delivered to said AC load from said source of alternating potential by changes in the impedance exhibited between said first and said second main electrodes controlled by a bias voltage applied to the gate electrode at a selected phase angle relative to the alternating potential;

a piezo-ferroelectric device including a first, a second and a common terminal;

means for applying electrical signals between the first and common electrodes of said piezo-ferroelectric device; and a circuit coupling the second and common terminals of said piezo-ferroelectric device to the gate electrode and first main electrode of said switch device for applying the bias voltage to the gate electrode of said switch device during each cycle of alternating potential.

13. A power control system as defined in claim 12 wherein said circuit includes a capacitor connected between the common electrode of said piezo-ferroelectric device and a fixed reference potential.

14. A power control system, comprising:

an AC load coupled to a source of alternating potential;

a switch device having first and second main electrodes and a gate electrode, said first and said second main electrodes operably connected with said AC load and said source of alternating potential to regulate the amount of power delivered to said AC load from said source of alternating potential by changes in the impedance exhibited between said first and said second main electrodes controlled by a bias voltage applied to the gate electrode at a selected phase angle relative to the alternating potential;

a piezo-ferroelectric device including a first, a second and a common terminal;

means for applying electrical signals between the first and common terminals of said piezo-ferroelectric device; and a circuit coupling the second and common terminals of said piezo-ferroelectric device to the gate electrode and first main electrode of said switch device for applying the bias voltage to the gate electrode of said switch device during each cycle of alternating potential, said circuit comprising a first and a second transistor each having a base electrode, an emitter electrode, and a collector electrode, the emitter-collector electrode current path of said first transistor connected in series with the base-emitter electrode current path of said second transistor and the gate electrode of said switch device, and the emitter-base electrode current path of said first transistor connected in series with the second-common terminal of said piezo-ferroelectric device and the collector-emitter electrode current path of said second transistor.

15. A power control system as defined in claim 14 including means connected between said signal applying means and a capacitor in said circuit for coupling said electrical signals to said capacitor and cooperating therewith such that said coupled signals are integrated and wherein a voltage is developed by said piezo-ferroelectric device between said device second and common terminals which is additively combined with said integrated signal to create a signal whose amplitude linearly changes over a portion of each cycle of alternating potential, said bias voltage being applied to said switch device when the amplitude of the linearly changing portion of said created signal reaches a predetermined level.

16. A power control system as defined in claim 15 including control means coupled to said piezo-ferroelectric device actuatable to adjust said piezo-ferroelectric device to change the gain of said device in a first direction such that the voltage amplitude of the linearly changing portion of said created signal is shifted in a direction to cause the bias voltage to be applied to said switch device earlier during a cycle of alternating potential and actuatable to adjust said piezo-ferroelectric device to change the gain of said device in a second direction such that the voltage amplitude of the linearly changing portion of said created signal is shifted in a direction to cause the bias voltage to be applied to said switch device later during a cycle of alternating potential.

17. A power control system as defined in claim 16 including a capacitance component connected between the signal applying means and the second terminal of said piezo-ferroelectric device, said component compensating for the effects of temperature dependent variations in said system.

18. A power control system, comprising:

an AC load coupled to a source of alternating potential;

a switch device having first and second main electrodes and a gate electrode, said first and said second main electrodes operably connected with said AC load and said source of alternating potential to regulate the amount of power delivered to said AC load from said source of alternating potential by changes in the impedance exhibited between said first and said second main electrodes controlled by a bias voltage applied to said gate electrode at a selected phase angle relative to the alternating potential;

a first and a second piezo-ferroelectric device each including a first, a second and a common terminal;

means for applying electrical signals between the first and common electrodes of each of said first and said second piezo-ferroelectric device;

a first circuit coupling the second and common terminals of said first piezo-ferroelectric device to the gate electrode and first main electrode of said switch device for applying the bias voltage to the gate electrode of said switch device during the first half of each cycle of alternating potential; and a second circuit coupling the second and common terminals of said second piezo-ferroelectric device to the gate electrode and the first main electrode of said switch device for applying the bias voltage to the gate electrode of said switch device during the second half of each cycle of alternating potential.

19. A power control system as defined in claim 18 wherein said first circuit includes a first and a second transistor of opposite conductivity type and each having a base electrode, an emitter electrode and a collector electrode, the second and common terminals of said first piezo-ferroelectric device connected in series with the emitter-base electrode current path of said first transistor, the collector-emitter electrode current path of said second transistor, the gate electrode of said switch device, and a capacitor common to said first and said second circuits; and said second circuit includes a third and a fourth transistor of opposite conductivity type and each having a base electrode, an emitter electrode and a collector electrode, the second and common terminals of said second piezo-ferroelectric device electrically connected in series with the emitter-base electrode current path of said third transistor, the collector-emitter electrode current path of said fourth transistor, the gate electrode of said switch device, and said capacitor.

20. A power control system as defined in claim 19 including a first capacitance component connected between the signal applying means and the second terminal of said first piezo-ferroelectric device and a second capacitance component connected between said signal applying means and the second terminal of said second piezo-ferroelectric device, said first and said second components compensating for the effects of temperature dependent variations in said system.

21. A power control system, comprising:

an AC load coupled to a source of alternating potential;

a switch device having first and second main electrodes and a gate electrode, said first and said second main electrodes operably connected with said AC load and said source of alternating potential to regulate the amount of power delivered to said AC load from said source of alternating potential by changes in the impedance exhibited between said first and said second main electrode controlled by a bias voltage applied to said gate electrode at a selected phase angle relative to the alternating potential;

a piezo-ferroelectric device including a first, a second and a common terminal;

means for applying electrical signals between the first and common electrode of said piezo-ferroelectric device;

a first ciruit coupling the second and common terminals of said piezo-ferroelectric device to the gate electrode and the first main electrode of said switch device for applying the bias voltage to the gate electrode of said switch device during the first half of each cycle of alternating potential; and a second circuit coupling the second and common terminals of said piezo-ferroelectric device to the gate electrode and the first main electrode of said switch device for applying the bias voltage to the gate electrode of said switch device during the second half of each cycle of alternating potential.

22. A power control system as defined in claim 21 wherein said first circuit includes a first and a second transistor of opposite conductivity type and each having a base electrode, an emitter electrode and a collector electrode, the second and common terminals of said piezo-ferroelectric device connected in series with the emitter-base electrode current path of said first transistor, the collector-emitter electrode current path of said second transistor, the gate electrode of said switch device, and a capacitor common to said first and said second circuits; and said second circuit includes a third and a fourth transistor of opposite conductivity type each having a base electrode, an emitter electrode and a collector electrode, the second and common terminals of said piezo-ferroelectric device electrically connected in series with the emitter-base electrode current path of said third transistor, the collector-emitter electrode current path of said fourth transistor, the gate electrode of said switch device and said capacitor.

23. A power control system, comprising:

an AC load coupled to a source of alternating potential;

a switch device including a first and a second main electrode and a gate electrode, said first and second main electrodes operably connected with said AC load and said source of potential to regulate the amount of power delivered by said source of alternating potential to said load, said power being regulated by changes in the impedance exhibited between said first and second main electrodes controlled by a bias voltage applied to said gate electrode at a selected phase angle relative to the alternating potential;

a signal translating stage connected to the gate electrode of said switch device for applying a bias voltage to said gate electrode when a voltage developed in said source reaches a predetermined level, said predetermined level being controlled by the amplitude of the bias voltage applied to said signal translating stage;

bias supply means coupled to said signal translating stage including a piezo-ferroelectric memory device electronically adjustable to exhibit a range of different conditions for providing bias voltage of adjustable amplitude to said signal translating stage, the amplitude of said bias voltage being determined by the condition of said adjustable memory device; and control means coupled to said adjustable memory device to electronically adjust said device to different conditions.

24. A power control system as defined in claim 20 wherein said signal translating stage comprises a first and a second transistor each having a base electrode, a collector electrode and an emitter electrode, the emitter-collector electrode current path of said first transistor connected in series with the base-emitter current path of said second transistor, and the emitter-base electrode current path of said first transistor connected in series with the collector-emitter electrode current path of said second transistor.

* * * * *